Sept. 4, 1956 A. W. OLSON ET AL 2,761,249
APPARATUS FOR MAKING MULTIPLE SHEET GLAZING UNITS
Filed Oct. 8, 1952 5 Sheets-Sheet 1

Inventors
Albert W. Olson and
John A. Woods
By Nobbe & Swope
Attorneys

Sept. 4, 1956  A. W. OLSON ET AL  2,761,249
APPARATUS FOR MAKING MULTIPLE SHEET GLAZING UNITS
Filed Oct. 8, 1952  5 Sheets-Sheet 2

Inventors
Albert W. Olson and
John A. Woods
By Nobbe & Swope
Attorneys

Inventors
Albert W. Olson and
John A. Woods
Nobbe & Swope
Attorneys

United States Patent Office 2,761,249
Patented Sept. 4, 1956

2,761,249

APPARATUS FOR MAKING MULTIPLE SHEET GLAZING UNITS

Albert W. Olson and John A. Woods, Toledo, Ohio, assignors to Libbey-Owens-Ford Glass Company, Toledo, Ohio, a corporation of Ohio Application October 8, 1952, Serial No. 313,628

14 Claims. (Cl. 49—1)

This invention relates broadly to the production of all-glass, multiple sheet glazing units. To be more specific, it relates to apparatus for automatically aligning the marginal edge portions of spaced sheets of glass with concentrated heat sources for sealing said edge portions together as said sheets are moved therepast.

Multiple sheet glazing units may be described generally as comprising two or more sheets of glass which are sealed entirely around their marginal edge portions in spaced relation to provide an hermetically sealed dead air space therebetween. Due principally to their insulating and condensation preventing qualities, such units have become well established fixtures in the building trades and have found wide usage as windows for buildings, show cases, vehicles, refrigerators, and the like.

It has been proposed to form these units entirely of glass by passing the marginal edge portions of spaced sheets of glass past concentrated heat sources to cause said edge portions to soften and bend into fused relation with one another. To be more specific, it has been proposed to continuously move spaced sheets of glass in a straight path and between opposed heat sources such that the opposite marginal edge portions of said sheets may be simultaneously fused together. Such a method and an apparatus for performing the same are disclosed in detail and claimed in a copending application, Serial No. 300,884, filed July 25, 1952, by John A. Woods, Donald E. Sharp, and Alfred E. Badger, and assigned to the assignee of this application. As well, the particular apparatus for automatically aligning and sealing said edge portions as they are moved therepast, which constitutes the subject matter of this application, is disclosed broadly but not claimed in said copending application.

It is of prime importance in the forming of all-glass, multiple sheet glazing units according to the above mentioned method, that the marginal edge portions of the glass sheets be in a predetermined and perfectly aligned relation with respect to the concentrated heat sources during their movement therepast and actual sealing thereof. It is also important that a predetermined spacing between the sheets be maintained not only during but immediately after the actual sealing of said marginal edge portions. Only in this manner are the exact controls essential to a permanent and hermetic seal between said edge portions possible.

One object of this invention is to provide opposed burners for supplying concentrated heat to the marginal edge portions of spaced sheets of glass, which burners will automatically be properly aligned with respect to said edge portions as they are moved therebetween.

Another object of this invention is to provide means for supporting said sheets in properly spaced relation as they are continuously moved in a straight path, which means are adapted to coact with opposed burners as they are moved therebetween to properly align said burners with the marginal edge portions of said sheets.

Still another object of this invention is to provide a mounting means for the burners of the type described which will permit the heads of said burners to be moved from a resiliently urged normal position to an operative position spaced from but parallel to said normal position.

Still another object of this invention is to provide a burner of the type described with means for automatically removing the support from the marginal edge portions of said sheets to be sealed just prior to their movement past the burner heads.

Still another object of this invention is to provide opposed burners of the type described which are adapted to be moved outwardly and into properly aligned relation with respect to the marginal edge portions of spaced sheets of glass when said sheets are moved between said burners and to return to their original position when said sheets have moved therepast.

Other objects and advantages of the invention will become more apparent during the course of the following description when taken in connection with the accompanying drawings.

Briefly stated, this invention involves apparatus comprising a furnace provided with a longitudinal, continuously moving conveyor on which glass sheet supporting trays may be carried past burners at opposite sides of said furnace for sealing together the marginal edge portions of said sheets. The burners are provided with heads from which flames may be played directly along said edge portions which are softened by said flames and freely bend into fused relation with one another. The burner heads and flames emitting therefrom are swivelly mounted above stationary stands and are resiliently urged into an inwardly disposed normal position.

In accordance with this invention, the burner heads are movable on said swivel mounting from the normal inwardly directed position to an operative position parallel to but spaced from said normal position. The tray upon which the glass sheets may be supported in spaced relation is constructed in such a manner as to coact with portions of said burners when moved therepast to cause said burner heads to automatically move in the manner described to the operative position, at which time the burner heads are in properly aligned relation with respect to the marginal edge portions of the glass sheets moving therepast.

The tray is also constructed in such a manner as to support marginal edge portions of the upper sheet of glass in fixed relation above those of the lower by means of rotatably mounted arms. Means are attached to the burners in a position to coact with said tray arms, as the tray is moved therepast, in order to remove the support from the marginal edge portions of the upper sheet just prior to the sealing thereof with those of the lower.

In the drawings, wherein like numerals are employed to designate like parts throughout the same.

Figures 1, 2:
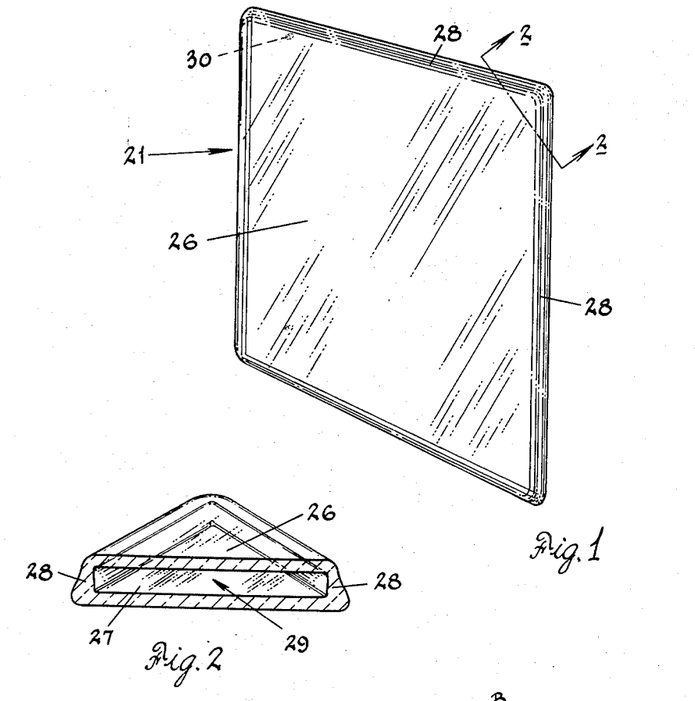
Fig. 1 is a perspective view of an all-glass, multiple sheet glazing unit produced by the apparatus disclosed herein.
Fig. 2 is a perspective sectional view of one corner of the glazing unit taken substantially along line 2—2 of Fig. 1.
Figure 3:
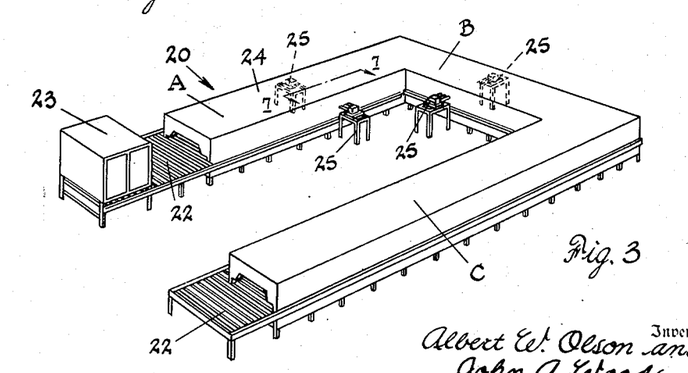
Fig. 3 is an overall perspective view of an apparatus for producing the glazing unit and showing the furnace, conveyor, and burners.

Referring now to the drawings, there is shown in Fig. 3 a perspective view of an apparatus 20 by means of which an all-glass, multiple sheet glazing unit 21 (Fig. 1) may be produced in the manner above mentioned. This apparatus includes a generally U-shaped, horizontally movable conveyor 22, over which are mounted, in order of use, a preheating compartment 23 and a furnace 24, conforming in shape generally to said conveyor. Within the furnace there are arranged a first sealing area A, a second sealing area B, and an annealing area C. Disposed outwardly of the furnace at opposite sides of sealing areas A and B are burner assemblies 25.

The all-glass, multiple sheet glazing unit 21 comprises upper and lower sheets of glass 26 and 27, respectively, and side portions 28 between the marginal edge portions of said sheets, forming therebetween an enclosed space 29. Disposed toward an edge or corner of one sheet of the unit is a dehydration hole 30 (Fig. 1) which may be hermetically sealed to seal off the enclosed space 29.

As previously mentioned and in a manner more fully described in the aforementioned copending application, the all-glass unit 21 is produced by assembling the upper and lower sheets 26 and 27 in fixed spaced relation, properly preheating the sheets, and moving them past concentrated heat sources from burner assemblies 25 to cause the marginal edge portions thereof to progressively soften, unite, and ultimately become sealed to one another. As assembled and prior to being sealed (Fig. 6), upper sheet 26 is relatively larger than lower sheet 27 such that a peripheral portion of said upper sheet extends outwardly beyond the marginal edge of the lower sheet.

Figure 7:
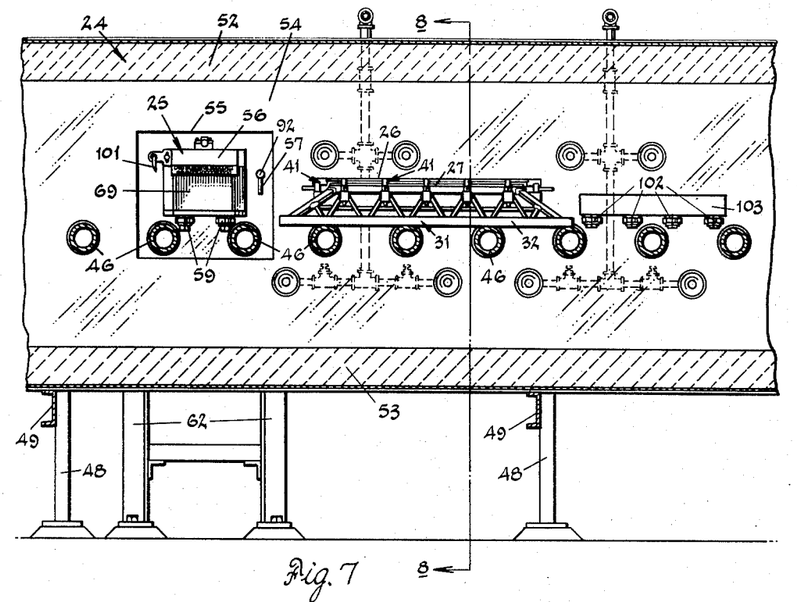
Fig. 7 is a longitudinal sectional view of the furnace, taken substantially along line 7—7 of Fig. 3, and showing the tray prior to its movement past one of the burners.
Figure 8:
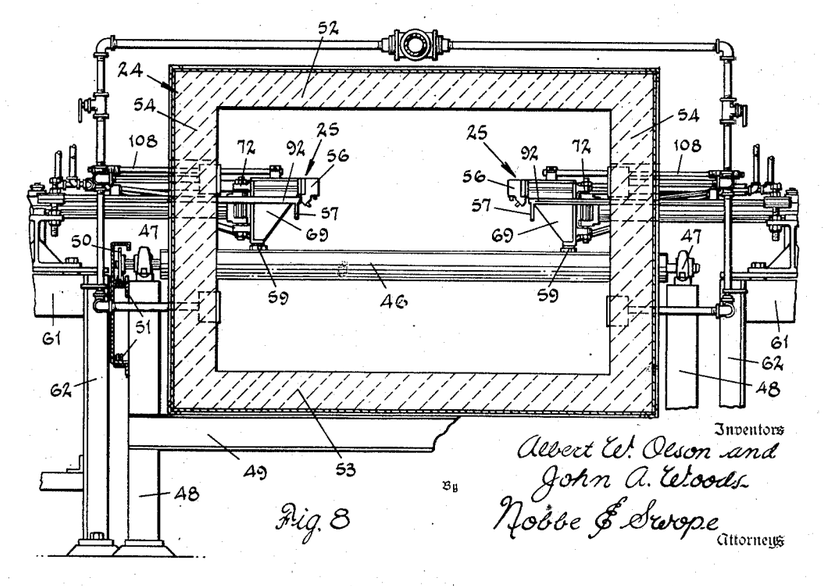
Fig. 8 is a transverse sectional view of the furnace, taken substantially along line 8—8 of Fig. 7, with the tray removed.

In being moved past concentrated heat sources to affect the seal described above, upper and lower sheets 26 and 27 are supported in properly spaced relation on a tray 31, which is moved on conveyor 22 forwardly through furnace 24 and past burner assemblies 25 in a manner to be described hereinafter. An elevational view of the entire tray 31 is shown in Fig. 7 and an enlarged but fragmentary view of the same can be seen in Fig. 10. However, particular reference is had to Figs. 4 to 6 for a description of the novel construction of the tray and its respective parts.

In plan, the tray 31 corresponds substantially to the outline of the glass sheets supported thereby. For purposes of illustration, the sheets and tray are shown as being of a square shape. The lower rim 32 of the tray is relatively larger than the upper rim 33 and is rigidly connected thereto by a series of angularly disposed struts 34 at each side of the tray and braces 35 at each corner thereof. Upper rim 33 conforms substantially to lower sheet 27, the marginal edge portions of which are supported on the upper edge of said rim. Additional support may be provided for the suspended central portion of said lower sheet by a rib 36 (Fig. 10) extending between opposite sides of upper rim 33 and having a rounded upper edge in horizontal alignment with the upper edges of said rim. A pan 37 of sheet metal or other suitable material, serving as a shield for lower sheet 27, is secured at each of its edges to struts 34 and braces 35 intermediate upper and lower rims 33 and 32.

Thus, for a purpose to be described hereinafter, the tray 31 is substantially trapezoidal in a transverse cross section. Adjacent the upper rim of the tray and secured between the apices of adjacent struts 34 are a plurality of bearings 38 having vertically bored journal openings. Pivotally mounted within each of the openings are pins 39 having headed portions 40 upon which are carried upper sheet supporting arms 41.

The arms 41 are slidably received in a channel through the upper side of said headed portions 40 and each of said arms is attached thereto by a bolt 42 extending through a slot 43 in said arm and threadedly received in said headed portion. Thus, upon loosening bolt 42, arm 41 may be moved a limited distance in a defined path through the channel of headed portion 40. Of course, upon tightening its respective bolt, each of the arms 41 may be securely locked in place in the desired position.

Each of said arms is indented at its inner end to form a ledge 44 for supporting the marginal edge portions of upper sheet 26 in proper spaced relation to those of lower sheet 27. Handles 45 extend outwardly from the opposite ends of the headed portions of each of the pins 39. Thus, each of the arms may be selectively swung by handles 45 in the plane of sheets 26 and 27 from an upper sheet supporting position, as shown by the three leftmost arms in Fig. 4, to a non-supporting or "knocked-out" position, as shown by the rightmost arm in said figure.

Preparatory to mounting upper sheet 26 above lower sheet 27, each of the arms 41 is swung to the supporting position and, if necessary, is adjusted in a direction perpendicular to the edge of the upper sheet to be supported thereon such that said sheet will be supported by each of the ledges 44 in at least substantially vertically aligned relation with respect to the lower sheet. Arms 41 may be of such length that the inner ends thereof below ledges 44 abut against the edges of lower sheet 27 to align the same with the upper sheet. When both upper and lower sheets 26 and 27 have been properly assembled on tray 31, in the manner described, the tray may be placed upon conveyor 22 so as to be moved through the preheating compartment 23 and furnace 24 and past concentrated heat sources in the form of burner heads on burner assemblies 25, as indicated by the broken lines of Fig. 6.

Conveyor 22 is composed of a series of spaced, horizontally disposed rollers 46 carried at each end in bearings 47 supported by the uprights 48 of a rigid framework which also includes transversely disposed channels 49 supporting the bottom wall of furnace 24 along its length. Secured to one outer end of each of said rollers is a sprocket 50 adapted to actively engage with the upper run of link chain 51. Thus, by any suitable power means (not shown) link chain 51 may be moved forward in the direction of the movement of tray 31 through furnace 24 to cause rollers 46 to rotate in a corresponding direction for so moving said tray. It is to be understood, of course, that a similar mechanism may be provided for each straight section of the conveyor 22 in the first and second sealing areas A and B and annealing area C of the furnace. By means of a directional transfer mechanism (not shown) and by coordinating the operation of the driving mechanisms for each conveyor section, a continuous movement may be provided through the entire length of the furnace 24.

Furnace 24, which may be, as shown, of a generally U shape conforming to conveyor 22, is composed of top and bottom walls 52 and 53, respectively, and side walls 54 of any suitable refractory material. Top wall 52 is elevated above the rollers 46 a distance sufficient to permit the free movement of tray 31 through the furnace as well as the movement of the forward portions of burners 25 through openings 55 in the side walls 54.

Each of the burner assemblies 25 includes a burner head 56 and means for mounting same in proper elevation with respect to upper and lower sheets 26 and 27 on tray 31 when moved therepast, a "knock-out" pin 57 for engaging handles 45 of the upper sheet supporting arms 41 of the tray, in a manner and for a purpose to be described, rails 58 adjacent opening 55 and disposed perpendicular to and outwardly from the side walls 54 of the furnace and over which the burner head mounting means may be moved inwardly and outwardly of opening 55 and into operative position with respect to the marginal edges of the glass sheets, and aligning rollers 59 for properly aligning the tray and burner head with respect to one another during movement of the tray therepast.

Rails 58, upon which the burner head mounting means is supported and adapted to be guidably moved, are secured by any suitable means, such as bolts 60, to a rigid stand constructed independently of the furnace, and comprising horizontally extending channels 61 and uprights 62.

The mounting means for each of burner heads 56 is provided with a base plate 63 having notched portions 64 at each side thereof for slidable engagement with the upper inner edges of rails 58. A series of lower cross bars 65 may be releasably held in engagement with the opposite lower edges of the rails by means of bolts 66. Thus, the cross bars 65, in addition to maintaining the burner head and mounting means therefor on rails 58, permits the base plate 63 to be either locked in place or to be moved in frictional engagement over rails 58 into the desired position relative to the furnace.

As previously mentioned, it is necessary in practicing this method of sealing multiple sheet glazing units that the marginal edge portions of the glass sheets 26 and 27 to be sealed be moved past the burner heads 56 at each side thereof in a predetermined spaced and perfectly aligned relation. That is, both the upper and lower rows of nozzles 67 and 68, respectively, on the burner heads must be in parallel relation to and equally spaced from said marginal edge portions at both sides of the furnace at all times during the passage of the sheets therepast. For this purpose, there is provided, in accordance with this invention, an arrangement whereby portions of the forwardly moving tray 31 will be caused to coact with aligning rollers 59 of the opposed burners 25 to automatically dispose the nozzle rows 67 and 68 in properly aligned relation with respect to the marginal edge portions of the glass sheets.

To be more specific, burner heads 56 on each of the opposed burners are mounted above base plates 63 in such a manner as to be normally resiliently urged inwardly toward one another. In addition, the mounting means for the burner heads are swivelly connected to said base plates so as to be movable outwardly with respect thereto. Thus, when base plates 63 are locked in place on rails 58, burner heads 56 of the opposed burners may be caused to move outwardly from one another, and relative to said base plates, from their normal inwardly urged position.

Thus, burners 25 may be moved into a position in which the rollers 59 suspended from housings 69 secured to the burner heads 56 will be spaced apart transversely of the furnace a distance just less than the length of the sides of lower rim 32 of tray 31. In this manner, when the tray is moved forwardly in at least approximately aligned relation with the space between opposed rollers, the opposed sides of said lower rim will coact with the rollers 59 for the opposed burner heads 56, in moving therepast, to cause said burner heads to move outwardly an amount just sufficient to permit the opposite sides of the lower rim of tray 31 to pass through the rollers 59 frictionally engaged thereby. To put it another way, the opposed burner heads will be spread out by tray 31 from their normal inwardly disposed position to what may be called an operative or sealing position.

Of course, when tray 31 is so disposed between the rollers 59 and the marginal edge portions of the glass sheets are actually being fused the burner heads 56 are maintained in the operative position by the inwardly urged mounting means thereof. That is, the arrangement of said mounting means above the base plate 63 serves, when said base plate is rigidly locked in place, to constantly maintain the rollers 59 for each of the burner heads in frictional engagement with the opposed sides of the lower rim 32 of the tray. As well, of course, the mounting means for each side urges its respective burner head inwardly with an equal amount of force such that each of said burner heads is balanced with respect to the opposite sides of the glass sheets. It will be understood, therefore, that when said tray is disposed between all four rollers, two on each side, the rows of nozzles on the burner heads will automatically be properly spaced from and aligned with respect to the opposed marginal edge portions of the glass sheets 26 and 27.

Dealing now specifically with the arrangement of the mounting means for each of said burner heads, mounting sleeves 70 and 71 are attached at their inwardly disposed ends to the rear wall of the housing 69 by means of pivotal hinge connections 72. Sleeve 70, disposed toward the forward (uppermost in Fig. 12) end of the furnace, is relatively shorter than sleeve 71 and is pivotally mounted at its outwardly disposed end above base plate 63 by a hinge connection 73. The longer sleeve 71, on the other hand, is pivotally mounted above said base plate by two similar connections 73, one of which is located at its outwardly disposed end and the other at a point inwardly of the connection for sleeve 70.

Figures 10, 11:
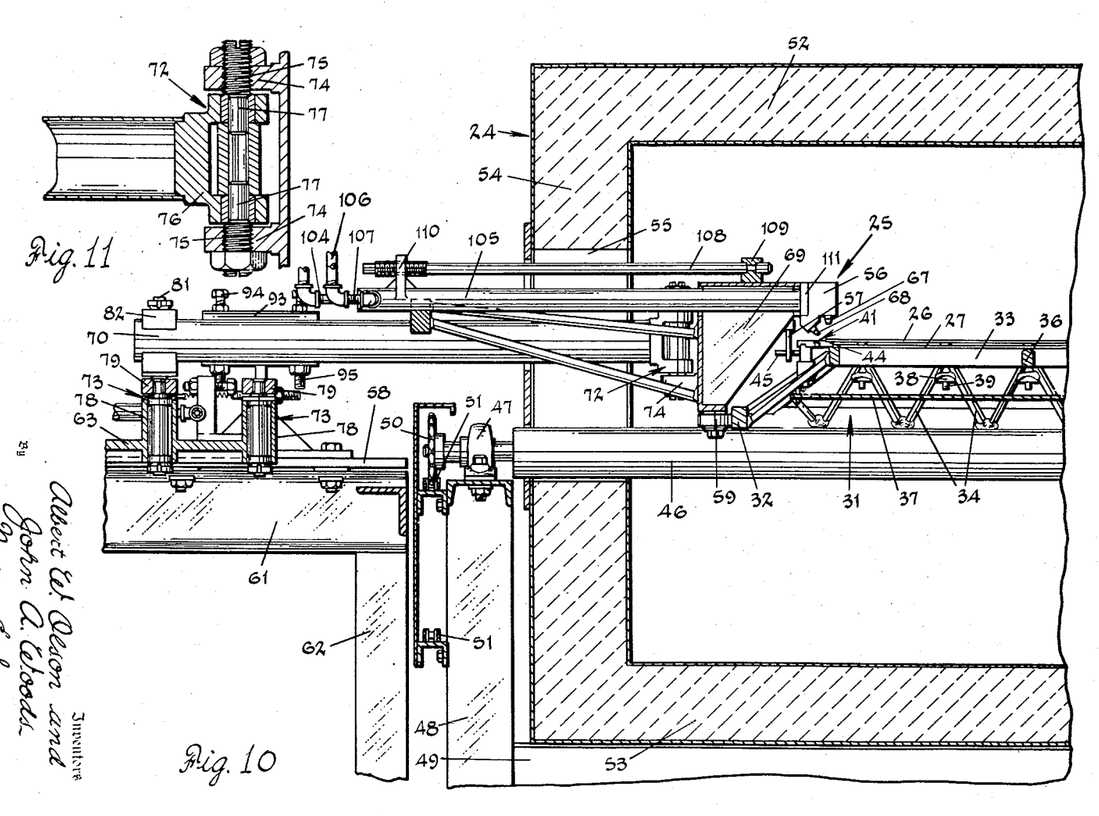
Fig. 10 is an enlarged transverse sectional view of a portion of the furnace and one of the burners, similar to Fig. 8 but showing the tray in operative relation with one of the burner heads.
Fig. 11 is an enlarged detailed sectional view of one of the pivotable hinge connections for the burner head of Fig. 10.

One of the hinge connections 72 is shown in detail in Fig. 11 and comprises arms 74 secured to the rear wall of housing 69 and having threaded vertical openings 75. Suitably bored openings in a connecting arm 76 are journaled on opposed hinge pins 77, received in the threaded openings 75 of arms 74. Sleeves 70 and 71 may be fitted over the shank of the connecting arms for each of the hinge connections 72.

Figures 12, 13, 14:
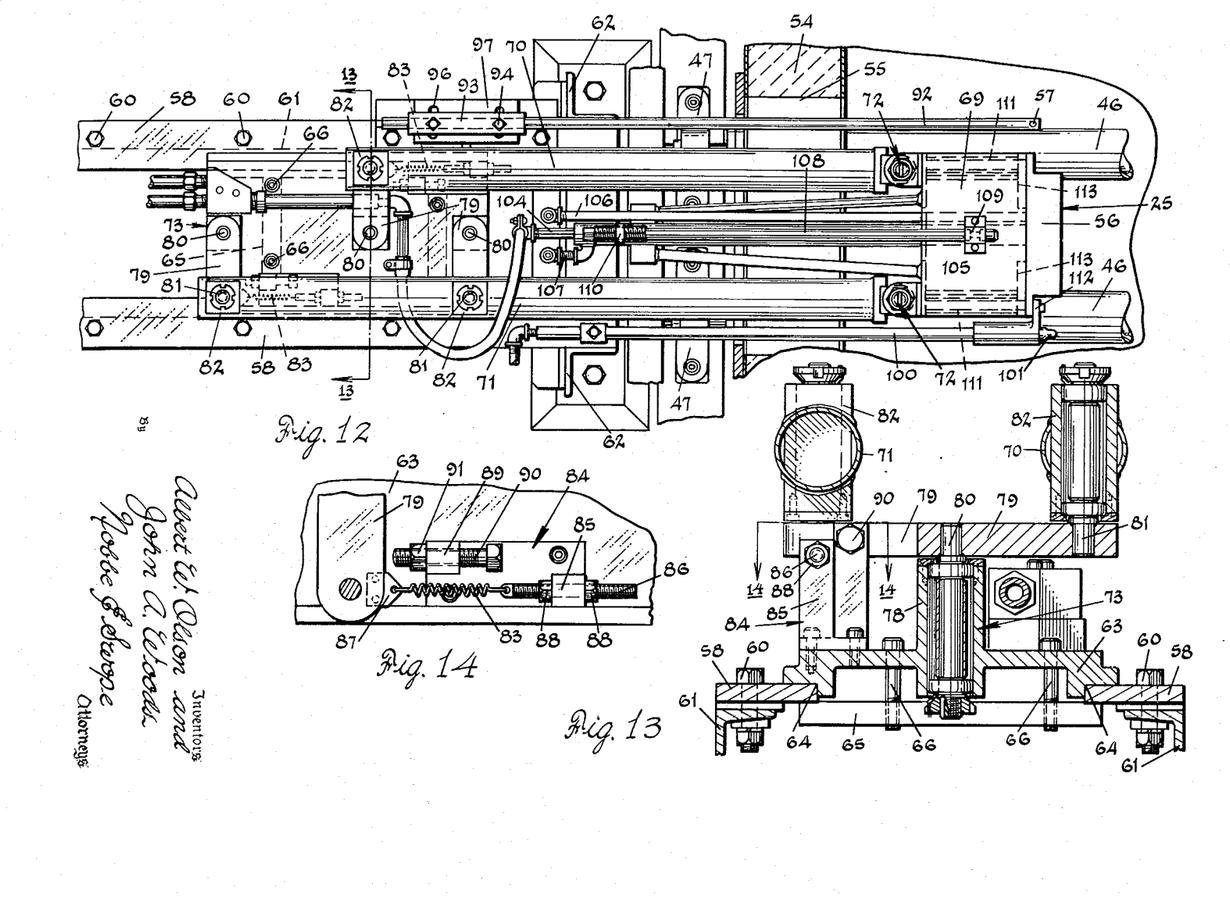
Fig. 12 is a plan view of one of the burners and a portion of the furnace shown in Fig. 10.
Fig. 13 is a transverse sectional view of the burner taken substantially along the line 13—13 of Fig. 12.
Fig. 14 is a plan view of a limiting device for the burner of Fig. 12, taken substantially along line 14—14 of Fig. 13.

Each of the hinge connections 73 is supported above base plate 63 by means of tubular columns 78 integrally cast with said base plate and extending upwardly therefrom, as best shown in Fig. 13. A swinging arm 79 is pivotally mounted from the top of each of said columns by a hinge pin 80, removably received in said column and having a hub portion extending upwardly therethrough, over which a journal opening in one end of said arm 79 is adapted to pivot. The opposite end of swinging arm 79 is suitably bored to receive the hub portion of a similar pin 81 which extends downwardly through a bearing sleeve 82 received in openings through either of the sleeves 70 or 71.

As can be seen from Fig. 12, the tubular columns 78 and axes of hinge pins 80 for each of the connections 73 are disposed in substantial alignment along the longitudinal axis of base plate 63. Thus, for example, in the operative or sealing position of the burner shown in said figure, sleeves 70 and 71 are in substantially parallel relation. As well, it will be understood that in swinging on the two hinge connections 73, sleeve 71 will traverse paths which are at all times parallel to one another. On the other hand, it is equally apparent that sleeve 70, swinging on only the single hinge connection 73, will move in paths the directions of which relative to one another will be dependent on the movement of burner head 56. Thus, there is provided, in a manner to be more fully explained hereinafter, an arrangement for mounting the burner heads which will automatically "give" and subsequently right itself as the burner 25 is contacted by and aligned with a rim of tray 31.

As a means for normally urging the mounting means for opposite burner heads inwardly toward one another, tension springs 83 (shown in detail in Fig. 14) are extended between swinging arms 79 on the hinge connection 73 for sleeve 70 and a portion of base plate 63 as well as between swinging arm 79 on the rear hinge connection 73 for sleeve 71 and another portion of said base plate. In both instances, however, the portion of base plate 63 to which one end of spring 83 is attached is forwardly of the arm to which the other end of the spring is attached. Thus, tension springs 83 provide resilient means for normally urging each of the mounting sleeves inwardly.

Dealing now specifically with one of said tension springs, bracket 84, securely mounted on base plate 63, includes at one end thereof an upstanding arm 85 having an opening through which a pin 86 may be threaded. The tension spring 83 is hooked at one end through an eye on the pin 86 and at the other end to a small plate 87 secured to swinging arm 79. The tension in said spring may be adjusted by the manipulation of pin 86 and lock nuts 88. At the opposite end of bracket 84, upstanding arm 89 receives, through a threaded opening therein, a limit screw 90 which is disposed in horizontal alignment with the side edge of arm 79. By means of lock nut 91, the end of said limit screw may be adjustably positioned, as desired, to limit the position to which swinging arm 79 may be urged inwardly by tension spring 83.

As shown in Figs. 12 and 14, the burner head mounting means is in an operative position in which the swinging arms 79 for each of the hinge connections 73 are disposed, for example, substantially parallel to one another and perpendicular to the parallel sleeves 70 and 71. In this position, each of the arms 79 is urged outwardly against the tension in springs 83 and is spaced slightly from the end of limit screws 90. On the other hand, in the normal inwardly disposed position of burner heads 89, the adjacent side edges of arms 79 will be in abutting relation with said limit screws such that each of the arms is disposed at least generally obliquely to sleeves 70 and 71. Thus, it will be understood that the front face of burner heads 56, and the rows of nozzles 67 and 68 may be moved from one position parallel to the movement of conveyor 22 and tray 31 supported thereon to another position spaced from but parallel to said first-mentioned position.

Of course, in the normal position of the burners, none of the aligning rollers 59 have been contacted by lower rim 32 of tray 31. In the operative position, however, the tray is disposed between all four rollers. Intermediate these positions, only the forward rollers, one on each opposite burner, are engaged by the forward end of the tray. Thus, as the forward end of the tray moves into the engaging position with the forward rollers, the burner heads and mounting means therefor will be caused to undergo a certain amount of "give."

Specifically, on each burner head 56 the forward rollers 59 will be moved outwardly by the lower rim of tray 31 causing sleeve 70 to swing on its pivotal hinge connection 72. As a result, arm 79 of sleeve 70 will swing in the opposite direction on hinge pin 80 away from its respective limit screw 90 and assume a position which, as illustrated, may be at least approximately perpendicular to the longitudinal axis of base plate 63. As the tray 31 moves further past burner heads 56, the forward end of its lower rim will engage the rear rollers 59 as the forward rollers are maintained in their outwardly disposed position by the rearward end of said lower rim. In compensating for the movement of the rear rollers, each sleeve 71 will be swung on its hinge connection 72 and the arms 79 for each of said sleeves will be swung in the opposite direction to assume positions at least approximately parallel to the arm 79 for sleeve 70. Of course, as tray 31 travels still further, lower rim 32 will move out of engaging position with the forward rollers 59 and the arm 79 for each sleeve 70 will return to its normal position in abutting relation with limit screw 90. When the lower rim of the tray is moved its entire length past the rollers, the arms 79 for each sleeve 71 will assume similar positions, at which time the burners will have returned to their normal inwardly disposed position.

It will be understood, therefore, that the burner heads are caused substantially simultaneously to undergo both a swiveling movement as well as inward and outward movement relative to the path of tray 31. That is, as the burner heads are caused to swivel on pivotal hinge connections 72 they are further moved either inwardly or outwardly by the substantially parallel movements of mounting sleeves 70 and 71. It will also be understood, as previously mentioned, that although the tray may not initially engage the rollers 59 of the burner heads in perfectly aligned relation between the opposed heads, prior to the passage of the marginal edge portions of the glass sheets past the rows of nozzles 67 and 68 the tray will be so aligned due to the balanced inwardly urged mounting means for said burner heads.

It will further be appreciated by one skilled in the art that the connections of the burner heads to the mounting sleeves and the mounting sleeves to rigidly secured base plate 63 will permit the mounting means to be selectively used in a number of ways. For example, on either one or both of the opposed burners, hinge pins 77 of pivotal hinge connections 72 could be replaced with bolts, in which case one or both of said burners would be caused to move only in an inward and outward direction relative to said trays in moving therepast. As a further example, both hinge pins 77 and either hinge pins 80 and 81 of hinge connection 73 may similarly be replaced by bolts on one of the opposed burners, in which case said burner would be held stationarily and all of the movement in aligning tray 31 with the opposed burners would occur at the other mounting means for the other burner.

As previously mentioned, it is necessary that the rows of nozzles 67 and 68 on opposed burner heads 56 be disposed in perfectly aligned relation to the opposite edge portions of the sheets 26 and 27 not only during the movement of the tray therepast but also during the actual sealing of said edges. That is, it is an important feature of this invention that the flames from the nozzles be directed to the edges of the sheets in a predetermined and constantly maintained relation during the actual sealing thereof.

Therefore, to provide the proper coordination between the aligning of the opposite marginal edge portions of the glass sheets with the burner heads 56 and the actual sealing of said edges, the tray 31 is specially constructed, in a manner previously described. That is, the cross section of the tray 31 is substantially trapezoidal with lower rim 32 thereof projecting a substantial distance outwardly beyond upper rim 33. As will be more fully understood from Fig. 7, the amount of this projection is slightly greater than the longitudinal distance between aligning rollers 59 on each burner head. In this manner, prior to the passage of any portion of the opposite edge portions of the sheets 26 and 27 past the nozzles of the burner heads 56, those portions of lower rim 32 projecting beyond upper rim 33 will have moved said burner heads to the operative or sealing position. In like manner, the burner heads 56 will be maintained in the operative position by the similar projecting portions of lower rim 32 at the rear end of the tray until the entire lengths of the opposite edge portions of the sheets have been sealed.

According to the above mentioned method, the actual sealing of the marginal edge portions of upper and lower sheets 26 and 27 is performed progressively along opposed sides of said sheets. That is, as they are passed by the burner heads 56, the marginal edge portions of the sheets are almost instantaneously fused together as the flames from the rows of nozzles 67 and 68 are played therealong. That is, each portion of said opposed edges is moved past the entire length of the upper and lower rows of burner head nozzles and, after having so passed, each of said portions is almost instantaneously fused as its spaced marginal edge portions are rendered molten and caused to unite.

Upper sheet supporting arms 41 on tray 31 have also been previously described as being movable from a supporting to a non-supporting or "knocked-out" position. "Knock-out" pins 57 are supported from each of the opposite burners at the forward sides thereof so as to engage handles 45 of the arms just prior to the movement of those portions of the glass sheet marginal edge portions supported thereby past the burner heads 56. That is, with particular reference to Fig. 7, it can be seen that as tray 31 moves past "knock-out" pins 57 prior to moving past the burner head nozzles, each of the upper sheet supporting arm handles 45 will be progressively moved to the "knocked-out" position.

In this manner, the opposed marginal edge portions of the sheets being fused will at all times during the fusing thereof be supported in properly spaced relation. That is, for example, as the supporting arms 41 for the forward end of the upper sheet are removed from their supporting position and the marginal edge portions of the forward end of the upper sheet are in the process of being fused with those of the lower, the remaining lengths of the opposed edge portions are maintained in properly spaced relation by the remaining arms 41. As well, due to the fact that the fusion takes place almost instantaneously, those portions of the opposite marginal edge portions which have passed burner heads 56 and have been transformed into side portions 28 also provide supports for properly spacing the sheets. Thus, by a combination of said fused portions of the sheets as well as supporting arms 41, upper and lower sheets 26 and 27 are at all times during the sealing operation maintained in properly spaced relation.

Figures 4, 5, 6, 9:
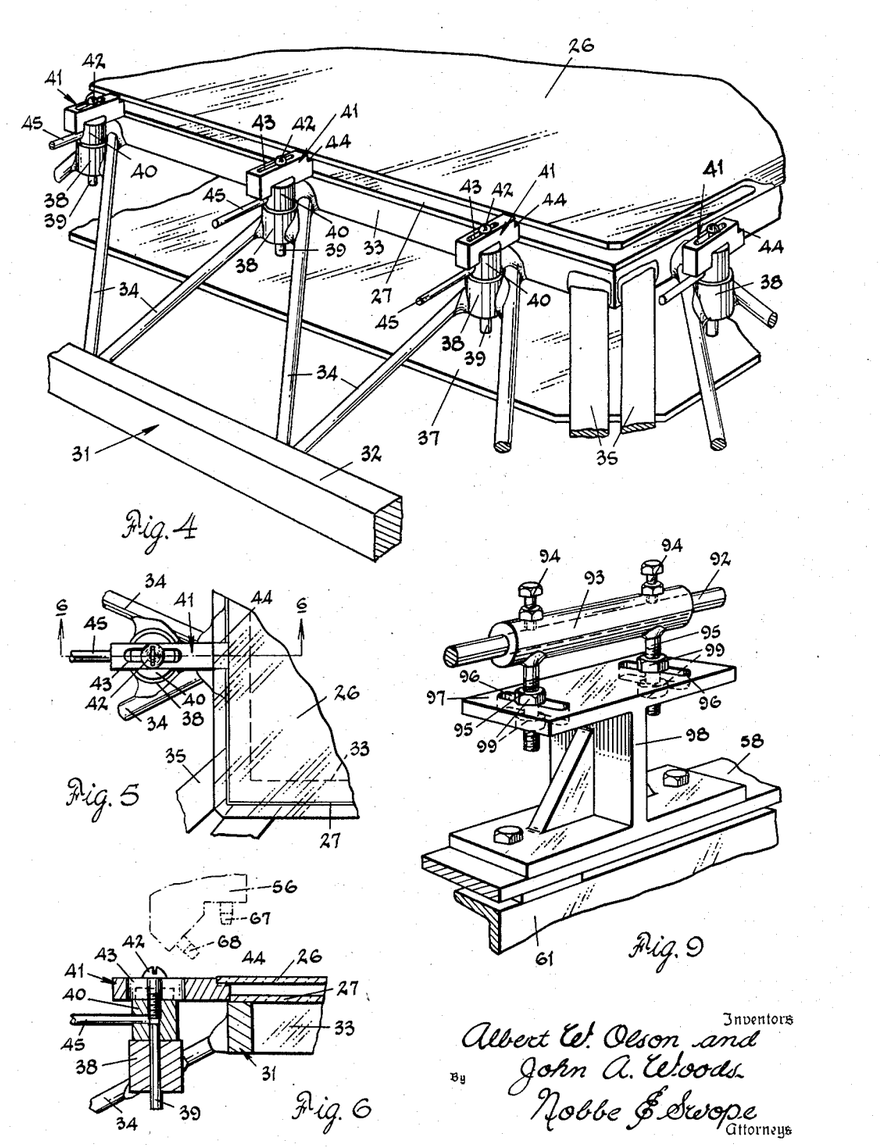
Fig. 4 is a fragmentary perspective view of a tray with the spaced glass sheets supported thereon.
Fig. 5 is an enlarged plan view of one of the supporting arms of the tray in supporting positions.
Fig. 6 is a sectional view of the supporting arm taken substantially along line 6—6 of Fig. 5.
Fig. 9 is a detailed perspective view of an adjusting device for a "knock-out" pin adapted to engage the tray supporting arms and move the same to a non-supporting position.

"Knock-out" pin 57 depends from a rod 92 which extends substantially parallel to sleeve 70 and is slidably received in a bearing sleeve 93 (Fig. 9). Set screws 94 are received through the top of the sleeve for locking rod 92 in place when it has been moved to the desired position longitudinally of the burner head mounting means. Threaded pins 95 depend from sleeve 93 and are received in slots 96 in the upper plate 97 of an "I" shaped support member 98. Lock nuts 99 serve to support the sleeve on the pins 95 in fixed relation above upper plate 97. The lock nuts may be loosened to permit pins 95 to be moved in slots 96 vertically as well as transversely of the burner head mounting means. The lower plate of support member 98 may be secured to rail 58 in any suitable manner.

By means then of the particular apparatus described in connection with Fig. 9, the "knock-out" pin 57 may be moved into any desired position to engage handles 45 of the upper sheet supporting arms 41 at a point along the path of said tray which will permit ledges 44 of said arms to be entirely removed from between glass sheets 26 and 27 prior to the movement of those portions of upper sheet 26 supported by said ledges past the burner heads 56. Thus, as shown in Fig. 7, the pin 57 is spaced slightly forward of burner head 56 such that just after a ledge 44 is entirely removed from a portion of the marginal edges of the glass sheets, flames from the rows of nozzles 67 and 68 will be directed thereto.

The sealed molten marginal edge portions of the sheets may be "set" and the suspended inner portions prevented from sagging by a jet of air directed along the lengths thereof to rapidly cool the same shortly after they have passed the burner head 56. Air for this purpose may be supplied from any suitable source (not shown) and carried through a pipe 100 (Fig. 12) extending along the rear side of the burner head mounting means to a nozzle 101 having a vertically directed opening disposed above the path of the marginal edge portions of the glass sheets.

Additional aligning rollers 102 (Fig. 7) may be suspended from supports 103 secured to the side walls 54 of the furnace at each side thereof forwardly of each of the sealing areas A and B and in substantial alignment with the space between the normally urged rollers 59 on burners 25 for properly aligning the tray 31 prior to its movement into engaging relation with the rollers 59.

Fuel may be supplied from any suitable source (not shown) to each burner head 56 through pipe 104 extending through conduit 105. Coolant may also be supplied from a suitable source (not shown) to burner head 56 through inlet pipe 106 (Fig. 12) and may be discharged to a suitable place of disposal through outlet pipe 107.

Additional means are provided whereby the burner head 56 may be moved, independently of the burner head mounting means, inwardly and outwardly of the marginal edge portions of the glass sheets. For the purpose of so adjusting the burner head independently of its mounting means, an adjusting rod 108 extends longitudinally above conduit 105 and is secured at its forward end in a mounting bracket 109 on the top wall of housing 69. A threaded portion at the rear end of said rod is received in a bracket 110 mounted above conduit 105.

Guide rods 111 extend rearwardly from wing portions 112 at each side of the burner head 56 and are slidably received in flanges 113 in the front face of the housing 69. Thus, a rotative movement of adjusting rod 108 will result in the guided movement of the burner head inwardly or outwardly of its mounting means, as desired.

To summarize briefly the operation of the novel aligning apparatus of this invention, it will be seen that as the tray 31 moves into engaging relation with the opposed burners 25 of either the first or second sealing area, the opposite sides of the lower rim 32 of the tray will engage rear rollers 59 on the opposed burners to spread said burners from the normal to the operative position. As tray 31 moves forwardly out of engaging relation with said burners they will return or right themselves to the normal position.

During the movement of the tray past the burners when they are disposed in the operative position, the marginal edge portions of the pair of opposite sides of the glass sheets adjacent said burners will be progressively fused, as the arms 41 supporting said opposite marginal edge portions of the upper sheet 26 are "knocked-out" and flames from burner head nozzles are played therealong.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. In combination with apparatus for sealing together the edge portions of spaced glass sheets, a tray supporting said sheets in spaced relation, means for moving said tray in a straight path, burner heads on opposite sides of said path, and mounting means for the burner heads, said mounting means having means normally urging said burner heads inwardly toward said path and being responsive to engagement by said tray for moving said burner heads into aligned relation with respect to the opposite edge portions of said sheets.

2. The combination set forth in claim 1, in which said tray includes rotatably mounted arms for supporting an upper sheet in spaced relation above a lower sheet and said mounting means includes means for moving each of said arms to a non-supporting position just prior to its passage past said burner heads.

3. The combination set forth in claim 1, in which each of said mounting means includes sleeves rotatably mounted at their outer ends above a rigid stand and swivelly connected at their inner ends to said burner head.

4. The combination set forth in claim 1, in which said tray includes an upper rim for supporting said sheets and an outwardly projecting lower rim for engaging each of said burner head mounting means at opposite sides thereof.

5. The combination set forth in claim 4, in which each of said burner head mounting means includes a plurality of rollers disposed in the path of the lower rim of said tray, the projection of said lower rim outwardly of said upper rim being approximately equal to the spacing of the outermost of said rollers.

6. A burner for sealing together the edge portions of spaced sheets of glass being moved in a predetermined path, comprising a burner head and means for mounting said burner head in properly aligned relation with respect to said edge portions, said mounting means including a stand, a pair of sleeves rotatably mounted at their outer ends above said stand in approximately parallel relation, one of said sleeves being longer than the other and rotatably mounted above said stand at an additional point inwardly of the outer end of said other shorter sleeve, means for normally urging said sleeves inwardly toward said predetermined path, swivel connections at the inner ends of said sleeves connecting the same to a housing for said burner head, and horizontally disposed rollers on said housing below and spaced inwardly of said burner head.

7. A burner of the character defined in claim 6, having a rod mounted above said stand in approximately aligned relation to said sleeves, a pin depending from the inner end of said rod, and means for moving said pin on said rod into predetermined relation with respect to said path of the glass sheets.

8. A burner of the character defined in claim 7, having means for moving said burner head transversely of said path independently of said mounting means.

9. In combination with a conveyor and burners at opposite sides thereof, mounting means for said burners, a tray for moving opposite edges of upper and lower spaced sheets of glass between and in aligned relation with the heads of said burners, said tray comprising an upper rim for supporting said sheets and a lower rim projecting outwardly from said upper rim for engaging with the mounting means for said burners.

10. A tray of the character defined in claim 9, in which arms are rotatably mounted on said tray outwardly of said upper rim for supporting the upper sheet of glass in properly spaced relation above the lower sheet.

11. In combination with apparatus for sealing together the edge portions of spaced glass sheets, means for supporting said sheets in spaced relation, means for moving said first-named means in a straight path, heating means arranged along said path, mounting means for said heating means, said mounting means having means normally urging said heating means inwardly toward said path and being responsive to engagement by said first-named means for moving said heating means into aligned relation with respect to the adjacent edge portions of said sheets.

12. In combination with apparatus for sealing together the edge portions of spaced glass sheets, means for supporting said sheets in spaced relation, means for moving said first-named means in a straight path, heating means on opposite sides of said path, and mounting means for said heating means, said mounting means having means normally urging said heating means inwardly toward said path and being responsive to engagement by said first-named means for moving said heating means into aligned relation with respect to the opposite edge portions of said sheets.

13. In combination with apparatus for sealing together the edge portions of spaced glass sheets, means for supporting said sheets in spaced face-to-face relation, means for moving said sheet supporting means and sheets carried thereby along a definite path, heating means arranged along said path, mounting means for said heating means, said mounting means being supported for movement toward and away from the path of said sheets, and means operatively connected to said mounting means for moving said heating means into aligned relation with respect to adjacent edge portions of said sheets.

14. In combination with apparatus for sealing together the edge portions of spaced glass sheets, means for supporting said sheets in spaced face-to-face relation, means for moving said sheet supporting means and sheets carried thereby along a definite path, heating means arranged along said path, mounting means for said heating means, said mounting means being supported for movement toward and away from the path of said sheets, and means carried by said mounting means for aligning said heating means in sealing position with respect to the adjacent edge portions of said sheets.

References Cited in the file of this patent

UNITED STATES PATENTS

| Number | Name | Date |
|---|---|---|
| 892,032 | Douglas | June 30, 1908 |
| 954,241 | Affelder et al. | Apr. 5, 1910 |
| 2,194,755 | Kell | Mar. 26, 1940 |
| 2,278,607 | Anderson | Apr. 7, 1942 |
| 2,624,979 | Clever et al. | Jan. 13, 1953 |